US011396626B2

(12) United States Patent
Tharkur et al.

(10) Patent No.: US 11,396,626 B2
(45) Date of Patent: Jul. 26, 2022

(54) SURFACTANT-FREE LIGHT-SELECTIVE CORE-SHELL PARTICLES, RELATED METHODS AND RELATED APPLICATIONS

(71) Applicant: University of Central Florida Research Foundation, Inc., Orlando, FL (US)

(72) Inventors: Jeremy Tharkur, Miami, FL (US); Swadeshmukul Santra, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/002,545

(22) Filed: Aug. 25, 2020

(65) Prior Publication Data

US 2020/0407630 A1    Dec. 31, 2020

Related U.S. Application Data

(63) Continuation of application No. 14/835,957, filed on Aug. 26, 2015, now abandoned.

(60) Provisional application No. 62/042,299, filed on Aug. 27, 2014.

(51) Int. Cl.
| | | |
|---|---|---|
| *B32B 5/16* | (2006.01) | |
| *C09K 11/57* | (2006.01) | |
| *C09K 11/08* | (2006.01) | |

(52) U.S. Cl.
CPC ........ *C09K 11/574* (2013.01); *C09K 11/0805* (2013.01)

(58) Field of Classification Search
CPC ............ C09K 11/0805; C09K 11/0811; C09K 11/572; C09K 11/574; Y10T 428/2991; B83B 1/00; B83B 1/008
USPC ......................................... 428/403
See application file for complete search history.

(56) References Cited

U.S. PATENT DOCUMENTS

| | | | |
|---|---|---|---|
| 9,247,734 B2 | 2/2016 | Sabin | |
| 9,717,251 B2 | 8/2017 | Sabin | |
| 9,718,739 B2 | 8/2017 | Sabin | |
| 2007/0049765 A1* | 3/2007 | Lucey | ..................... C30B 7/005 977/843 |
| 2010/0163800 A1* | 7/2010 | Peng | .................... C09K 11/025 252/301.6 S |
| 2010/0316797 A1 | 12/2010 | Ying et al. | |
| 2016/0060513 A1* | 3/2016 | Tharkur | ............... C09K 11/574 428/402 |

OTHER PUBLICATIONS

Dong et al., A Generalized Ligand-Exchange Strategy Enabling Sequential Surface Functionalization of Colloidal Nanocrystals J. Am. Chem. Soc. 2011, 133, 998-1006 [dx.doi.org/10.1021/ja108948z] (Year: 2011).*

(Continued)

*Primary Examiner* — Hoa (Holly) Le

(57) ABSTRACT

A method for preparing a light sensitive particle that uses at least one metal precursor material and at least one dopant precursor material mixed in solution absent a surfactant. Upon an optional adjustment of pH to about 3 to about 6, a light-sensitive particle comprising a metal-dopant material may be formed and separated from the solution. The light-sensitive particle may comprise a Q-dot particle. Also described are the particles themselves.

10 Claims, 12 Drawing Sheets

(56) References Cited

OTHER PUBLICATIONS

Nag et al., Metal-free Inorganic Ligands for Colloidal Nanocrystals: as Surface Ligands, J. Am. Chem. Soc. 2011, 133, 10612-10620 [dx.doi.org/10.1021/ja2029415] (Year: 2011).*

Jin et al., Preparation and Characterization of Highly Fluorescent, Glutathione-coated Near Infrared Quantum Dots for in Vivo Fluorescence Imaging, Int. J. Mol. Sci. 2008, 9, 2044-2061; DOI: 10.3390/ijms9102044 (Year: 2008).*

Cao et al., Facile synthesis of high-quality water-soluble N-acetyl-L-cysteine-capped Zn1-xCdxSe/ZnS core/shell quantum dots emitting in the violet-green spectral range, Journal of Colloid and Interface Science 348 (2010) 369-376 (Year: 2010).

Chomoucka et al., Synthesis of Glutathione Coated Quantum Dots, Czech Republic (Year: 2013.

Mews et al., Preparation, Characterization, and Photophysics of the Quantum Dot Quantum Well System CdS/HgS/CdS, J. Phys. Chem. 1994, 98, 934-941 (Year: 1994).

Ajimsha et al., Luminescence from surfactant-free ZnO quantum dots prepared by laser ablation in liquid, Electrochemical and Solid-State Letters, 11 (2) K14-K17 (2008) (Year: 2008).

Xie et al, Synthesis of highly fluorescent LaF3:Ln3+/LaF3 core/shell nanocrystaltas by a surfactant-free aqueous solution route, Journal of Solid State Chemistry 182 (2009) 597-601. (Year: 2009).

Ghows et al., Sono-synthesis of core-shell nanocrystal (CdS/Ti02) without surfactant, Ultrasonics Sonochemistry 19 (2012) 1070-1078 (Year: 2012).

Duan et al., High quantum-yield CdSexS1-x/ZnS core/shell quantum dots for warm white light-emitting diodes with good color rendering, Nanotech. 24 (2013) 285201.

Jin et al., Preparation and Characterization of highly flurorescent glutathione-coated near infrared quantum dots for n Vivo Fluorescence Imaging, Int. J. Mol. Sci. 2008, 9, 2044-2061.

* cited by examiner

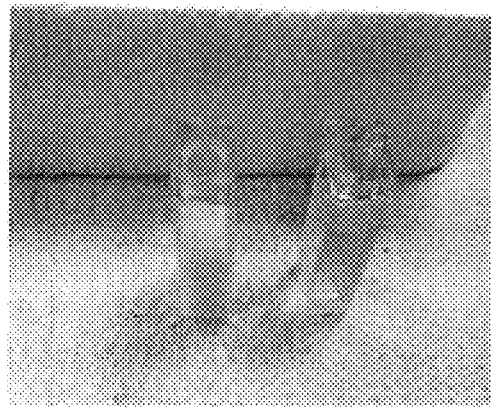
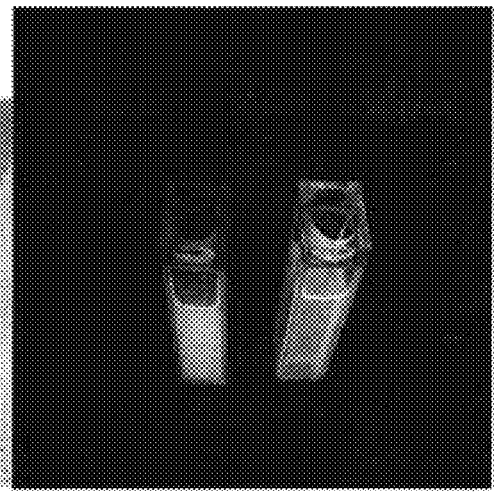
FIG. 1A          FIG. 1B
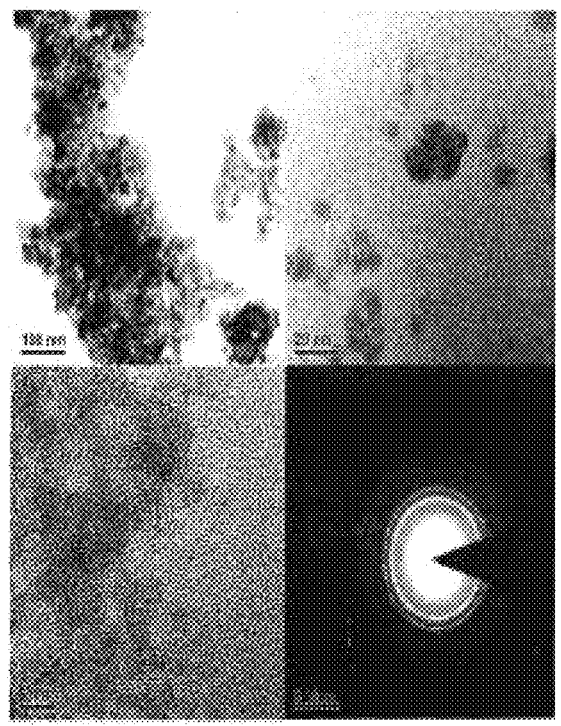
FIG. 2A

SURFACTANT-FREE LIGHT-SELECTIVE CORE-SHELL PARTICLES, RELATED METHODS AND RELATED APPLICATIONS

CROSS-REFERENCE TO RELATED APPLICATION

This application is a Continuation of U.S. Non-Provisional patent application Ser. No. 14/835,957, filed Aug. 26, 2015, titled LIGHT-SELECTIVE PARTICLES, RELATED METHODS AND RELATED APPLICATIONS, which relates to, and derives priority from, U.S. Provisional Patent Application Ser. No. 62/042,299, filed Aug. 27, 2014 and titled "Fluorescent Gels and Methods of Making Fluorescent Gels," the content of each of which are incorporated herein fully by reference.

GOVERNMENT SUPPORT

The embodiments as described herein, and the inventions as claimed herein, were made with United States Government support under Contract/Grant No. 1159500, awarded by United States National Science Foundation. The United States Government has rights in the invention as claimed herein.

BACKGROUND

Field

Embodiments relate generally to light-selective particles and methods for preparing the light-selective particles. More particularly, embodiments relate to light-selective particles with enhanced performance and methods for preparing the light-selective particles with the enhanced performance.

Description of the Related Art

Light-selective particles, such as but not limited to light-emitting particles, and more particularly such as but not limited to fluorescent light-emitting particles which are intended to include quantum dot particles (i.e., Q-dot particles), find use in several scientifically advanced technical applications, including but not limited optical computing applications and molecular biology applications. Within the context of these applications, the light-selective particles may be included and used within devices such as but not limited to photovoltaic devices, light-emitting diode devices and photodetector devices.

While light-selective particles, including in particular fluorescent light-emitting particles such as Q-dot particles, are key enabling components within several scientifically advanced technical applications, light-selective particles are nonetheless not entirely without problems. In that regard, it is often difficult to prepare light-selective particles, and in particular fluorescent light-emitting particles such as Q-dot particles, with enhanced purity to ensure optimal operation of apparatus and components predicated upon use of those light-selective particles.

Thus, desirable within the light-selective particle art are enhanced performance light-selective particles and methods for preparing the enhanced performance light-selective particles.

SUMMARY

Embodiments include light-selective particles such as but not limited to fluorescent light-emitting particles, and methods for preparing the light-sensitive particles such as but not limited to the fluorescent light-emitting particles. In a particular embodiment, light-selective fluorescent light-emitting particle compositions in accordance with the embodiments are 100% free of a surfactant, as compared with otherwise known fluorescent light-emitting particle compositions prepared using at least one surfactant, where removal of all the surfactant residue post light-emitting particle preparation (i.e., synthesis) may otherwise prove to be quite difficult. Surfactant materials when used for fabricating light-sensitive particles serve as emulsifying agents that lower a surface tension between an aqueous phase and an organic phase of a synthesis mixture or solution that is used for preparing the light-sensitive particles. This particular absence of a surfactant residue provides a light-emitting particle of greater light emitting intensity insofar as surfactant residue induced quenching and absorption is eliminated. In addition, such an absence of a surfactant residue also provides light-sensitive particles that are more light-sensitive, as is the need for light-sensitive particle applications.

A particular method in accordance with the embodiments (i.e., a sol-gel method that is alternatively referred to as a "sol-glow" method that yields "sol-glow" particles which may comprise fluorescent gel particles) provides a water based one-pot chemical synthesis method that is rapid and relies on simple mixing steps. This particular method and the related resulting fluorescent light-emitting particles are of particular interest within the context of electronic and optoelectronic applications. For agriculture industry applications, light-emitting particles can serve as a plant nutrient fertilizer and also as an antimicrobial agent that is intended to protect crops from bacterial and other microbial infections. In general the sol-gel method in accordance with the embodiments is readily extendable to various inorganic light sensitive semiconductor materials which may be subsequently coated with various organic light sensitive dye materials (i.e., fluorescent dye materials) using chemical reaction methodology as is otherwise generally known in the particle preparation art.

Methodological embodiments in accordance with the present disclosure can include mixing at least one first water soluble core metal precursor material (e.g., at least one water soluble metal compound such as but not limited to cadmium acetate, Zinc acetate, manganese acetate, or the like) with at least one first water soluble anion precursor material (e.g., Sodium Sulfide or the like) to form a metal core material. By adding a specific quantity of at least one second water soluble shell metal precursor material and at least one second water soluble anion precursor material, a core-shell light-emitting particle may be formed absent a surfactant residue. Under certain instances of certain specific precursor material choices a change in pH may additionally be desirable to achieve most efficient production of the resulting core shell light-emitting particles. Typically the pH of the final composition may be adjusted to about 3 to 6 to form the desirable resulting core-shell light-emitting particles. The process of forming the core-shell light-emitting particles which are alternatively designated as fluorescent gel particles in accordance with the embodiments is Surfactant free (e.g., whereas in comparison Surfactants are otherwise generally used to form Q-dots and the like), which is distinct in comparison with other processes.

In a particular embodiment, the at least one water soluble first core metal precursor material, the at least one water soluble first core anion precursor material, the at least one water soluble second shell metal precursor material and the at least one water soluble second shell donor precursor material are in the aqueous phase. In a particular embodiment, the resulting core-shell fluorescent light emitting particles can be selected from: CdS:Mn/ZnS, ZnS:Mn/ZnS, MnS:Mn/ZnS, or the like, where the foregoing chemical formula are intended as representative of a core-shell (i.e., core: shell) structure. In an embodiment, the formed fluorescent gel particles are 100% free of surfactant. Additional fluorescent gel particle preparation details are provided in the experimental examples recited below.

The present disclosure describes a surfactant-free method for preparing a dopant/metal based water-dispersible fluorescent gel particle (such as CdS:Mn/ZnS, ZnS:Mn/ZnS and MnS:Mn/ZnS) (analogous terminology is fluorescent quantum dot particle, Q-dot particle). The methodology in accordance with the embodiments uses a one-pot water based chemical preparation and synthesis method that is simple enough to produce high-quality gel particles in Scalable quantity (metric ton Scale). The process is rapid and relies on simple mixing steps. Surfactant-free gel particles are particularly desirable for applications in the electronic, optoelectronic and agriculture industries.

A particular particle in accordance with the embodiments includes at least one portion that includes a light-selective composition absent a surfactant residue.

A particular method for preparing a particle in accordance with the embodiments includes mixing in an aqueous solution absent a surfactant material at least one metal precursor material and at least one anion precursor material to provide a metal anion material particle absent a Surfactant residue.

Another particular method for preparing a particle in accordance with the embodiments includes mixing in an aqueous solution absent a surfactant material at least one metal precursor material and at least one anion precursor material to provide a metal anion material particle absent a surfactant residue. This other particular method also includes further reacting the metal anion material particle absent the Surfactant residue with an encapsulant precursor material to provide a core-shell encapsulated metal anion material particle.

Another particular particle in accordance with the embodiments includes first light sensitive area comprising a first light sensitive material and a second light sensitive area comprising a second light sensitive material different than the first light sensitive material.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, which form a material part of this disclosure wherein:

FIG. 1A (left) shows room lighting images illustrating surfactant free gel particles on the left and micro-emulsion surfactant synthesized gel particles on the right. FIG. 1B (right) shows UV-excitation image showing the fluorescence of surfactant free gel particles on the left and micro-emulsion synthesized gel particles on the right.

FIG. 2A shows three high resolution transmission electron microscopy (HRTEM) images showing 5 nm sized gel particles. The fourth image shows selective area electron diffraction (SAED) image that illustrates the crystallinity and lattice plane spacings.

DETAILED DESCRIPTION OF THE NON-LIMITING EMBODIMENTS

I. General Considerations

Figure 2B:
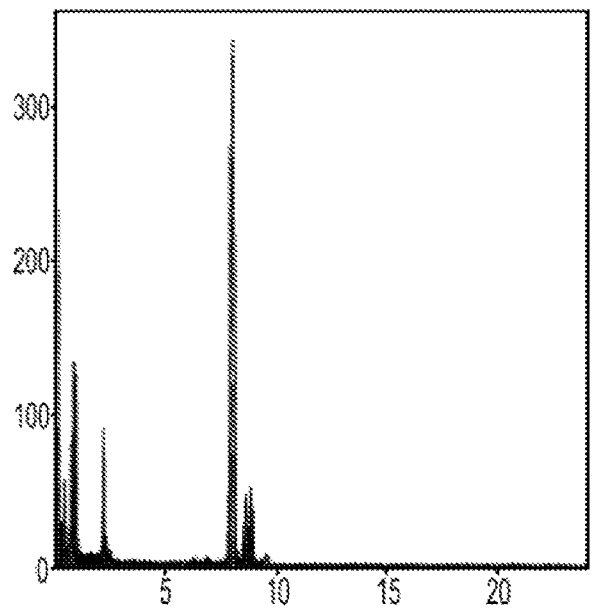
FIG. 2B shows electron dispersion x-ray (EDX) spectroscopy confirming the particle composition of ZnS:Mn gel particles on a carbon coated copper grid.

Embodiments provide a light-sensitive particle with enhanced purity and performance, and a method for preparing the light-sensitive particle with the enhanced purity and the enhanced performance. To achieve the foregoing results, the embodiments utilize when fabricating a light-sensitive particle in accordance with the embodiments an aqueous solution method that uses at least one water soluble metal precursor material and at least one water soluble anion precursor material. The method comprises a sol-gel method that may be undertaken at room temperature while using water soluble and residue free source materials, along with an optional acid material or an optional base material as a light-selective particulate precipitant material.

While the embodiments illustrate as a light-sensitive particle a light-emitting particle such as a fluorescent light-emitting particle further such as a Q-dot fluorescent light-emitting particle, the embodiments are not intended to be so limited. Rather the embodiments are intended to include light-sensitive particles including but not limited to light-emitting particles and light-absorbing particles. Such light absorbing particles may include but are not necessarily limited to photovoltaic particles.

Within the context of the embodiments, a metal precursor material may comprise a water soluble metal material selected from the group including but not limited to salts (i.e., and in particular acetate salts) of metals including but not limited to metals of atomic numbers 25 to 30 and additionally up to 48. More specific and more preferred within the embodiments metals include manganese, zinc and cadmium as acetate salts. Acetate salts are particularly desirable within the context of the embodiments insofar as acetate residues are often thermally decomposable and may be residue free.

Other particular embodiments are not strictly limited to metal-donor material based light emitting material, but are also intended to include other light-emitting materials such as but not limited to light emitting semiconductor materials which are described further below and which are generally compound complementary semiconductor materials.

Within the context of the embodiments, an anion precursor material may be selected from the group including but not limited to sodium sulfide anion precursor materials and sodium selenide anion precursor materials. Other anion precursor materials are not excluded which include but are not limited to elements of the lanthanide region of the periodic table such as but not limited to dysprosium and gadolinium.

The sol-gel preparation method that may be used to form the light-sensitive particles in accordance with the embodiments may generally be undertaken at a temperature from about 20 to about 37 degrees centigrade for a preparation (i.e., synthesis) time period from about 5 to about 10 minutes, although greater or lesser preparation times and preparation temperatures are not excluded.

In general, the embodiments provide a sol-gel method for preparing a light sensitive particle absent the use of a surfactant, thus providing the light sensitive particle absent a surfactant residue. Within the embodiments the light sensitive particle may comprise a simple light sensitive particle having a homogeneous composition. The resulting light-sensitive particle may also be a core-shell particle having a first composition for the core and a second composition different than the first composition for the shell that surrounds the core. Moreover, the embodiments also include a sol-gel method for preparing a core-shell composite nanoparticle that includes at least one light-sensitive component (i.e., one of the core component and the shell component) and at least one insulator component which may be a transparent insulator component. This latter group of composite light-sensitive particles may include the insulator layer as either a core layer or a shell layer. The presence of the insulator layer within the composite light-sensitive particle provides the light-sensitive particle with either desirable optical properties such as photo-stability and resistance to photo-bleaching or alternatively desirable surface properties such as stable water dispersability, longer shelf-life and specified targeting for biomedical and agricultural applications.

II. Specific Considerations

Embodiments of the present disclosure provide in-part for methods of preparing fluorescent gel particles, and the like, while using a sol-gel method. In an embodiment, fluorescent light-emitting gel particles of the present disclosure are 100% free of surfactant, as compared to known compositions made using surfactants, where removal of all the surfactant post light emitting gel particle preparation can be very difficult. In an embodiment, the method is a water based one-pot chemical synthesis method that is rapid and relies on simple mixing steps. This method and the fluorescent light-emitting gel particles that result from the method are of particular interest to electronic, optoelectronic and agriculture industries.

Embodiments of the present disclosure can include mixing a first metal precursor material (e.g., metal compound such as cadmium acetate, Zinc acetate, manganese acetate, or the like) with a first anion precursor material (e.g., sodium sulfide or the like) to form a first metal-anion material. Next the pH of the composition is adjusted to about 3 to 6 to form the light-emitting fluorescent gel particles. The process of forming the fluorescent gel particles is Surfactant free (e.g., does not include Surfactants used to form Q-dot particles and the like), which is distinct with other processes. In an embodiment, the first metal precursor material, the first anion precursor material, the second metal precursor material and the second anion precursor material are in the aqueous phase. In an embodiment, the fluorescent light-emitting gel particles can be selected from: CdS:Mn/ZnS, ZnS:Mn, MnS:ZnS, or the like. In an embodiment, the formed fluorescent light emitting gel particles are 100% free of surfactant. Additional details are provided in the experimental examples.

The present disclosure describes a surfactant-free method of preparing dopant/metal based water-dispersible fluorescent light-emitting gel particles (such as CdS:Mn/ZnS, ZnS:Mn and MnS:/ZnS) particles (analogous terminology is fluorescent quantum dots, Q-dot particles). This is a one-pot water based chemical synthesis method that is simple enough to produce high-quality gel particles in Scalable quantity (metric ton Scale). The process is rapid and relies upon simple mixing steps. Surfactant-free fluorescent light-emitting gel particles are particularly desirable for applications in electronic optoelectronic and agriculture industries.

Traditionally fluorescent light-emitting Q-dot particles including dopant/metal based Q-dot particles are synthesized by a wet chemical method that is not a sol-gel method. In all cases, a mixture of a Surfactant and a capping agent (Such as a mixture of trioctylphosphine (TOP; a Surfactant) and trioctylphosphine oxide (TOPO; a capping agent), commonly known as TOP/TOPO mixture) is used. Water-in-oil (W/O) microemulsion method is also used to prepare (i.e., synthesize) fairly high-quality dopant/metal based Q-dot particles at room temperature. However, a Surfactant is used to prepare a W/O micro-emulsion. A conventional Q-dot particle purification process is extremely cumbersome, expensive and generates undesirable waste. Moreover, complete removal of a surfactant residue from a Q-dot particle Surface is extremely challenging without compromising electronic and optoelectronic properties of the Q-dot. Due to these limitations, bulk scale production of high-quality dopant/metal based Q-dot particles has not been possible.

Water dispersability of the disclosed fluorescent light-emitting gel particles may be achieved through Surface modifications with hydrophilic coating agents which include, but are not necessarily limited to Sodium gluconate, Sodium salicylate, N-acetylcysteine (antioxidant molecule), glutathione (antioxidant tripeptide molecule), quaternary ammonium salts and tetraethylorthosilicate materials. Other materials that may be used are listed in the foregoing descriptions of the drawings. Such fluorescent light-emitting gel particle modification does not compromise the integrity of the dopant/metal core of the fluorescent light-emitting gel particles. Fluorescent light-emitting gel particles size and crystallinity may be characterized using HRTEM in a dry state. The average fluorescent light-emitting gel particle crystal size was about 5 nm. A fluorescent light-emitting gel particle with a hydrophilic coating is characterized in Solution using dynamic light scattering (DLS) technique. DLS measured the hydrodynamic diameter of the fluorescent light emitting gel particles in the range of about 18-20 nm, respectively, and show crystal sizes ranging from about 5-10 nm without hydrophilic coating and about 18-20 nm with hydrophilic coating.

Fourier-transform infrared (FTIR) spectroscopy measurements of lyophilized samples confirmed the presence of hydrophilic coating on the fluorescent light-emitting gel particles when compared to bare fluorescent light-emitting gel particles. These fluorescent light-emitting gel particles emit at ~587 nm with 326 nm excitation (ZnS:Mn) and 590 nm with 350 nm excitation (CdS:Mn/ZnS). A preparation protocol and fluorescent sol particles characterization data are presented below.

In addition to the fluorescent gel particles described above and below, embodiments of the present disclosure can be directed to fluorescent light-emitting gel particles having other chemical compositions. As a result, the first metal core precursor material, the first anion core precursor material, the second metal shell precursor material and the second anion shell precursor material are or may be independently selected to form the desired fluorescent light-emitting gel particles.

As mentioned above, nano-particles in accordance with the disclosure and the embodiments may include, but are not necessarily limited to, fluorescent light emitting semiconductor Q-dot particles. In general, Q-dot particles include a core material and a capping (also called a shell) material. The "core" is a semiconductor or doped or undoped insulator nano-particle with dimensions of about 1 to 250 nm. While any core of the IIB-VIA, IIIA-VA, or IVA-IVA, IVA-VIA, IB-IIIA-VIA semiconductors or doped or undoped insulator can be used in the context of the present disclosure, the core may or may not be a luminescent NP, whose luminance may be increased by a capping layer whereby the capping layer provides further surface passivation and protection to the core for the fluorescence process. Recombination of the electron-hole pair becomes possible as opposed to without the capping layer where the electron-hole recombination event would not take place. A IIB-VIA semiconductor is a compound that contains at least one element from Group IIB and at least one element from Group VIA of the periodic table, and so on. The core can include two or more elements. In an embodiment, the core of the nanoparticles can also be a transition metal oxide or lanthanide metal oxide NP doped with rare earth or transition metal ions, or a combination thereof. In another embodiment, the core of the NP is a Group IA or IIA or solid solutions between Group IA elements, Group IIA elements, and combination thereof, or lanthanide metals bound to a Group VIIA halide with or without a dopant, particularly rare earth ions and transition metal ions, Ce-doped Lu, Y and Gd oxyorthosilicates, Ce-doped oxyorthosilicates made with a combination of at least two of the elements Y, Lu and Gd, Ce-doped Sr or Ba hafanate, or alloys such as $Lu_{2x}Gd_{2(1-x)}SiO_5:Ce$ or $Ce_xLa_{1-x}F_3$ (x is variable from about one to zero). In one embodiment, the core is an IIB-VIA, IIIA-VA, or IVA-IVA semiconductor that can be about 1 nm to 40 nm, about 1 nm to 30 nm, about 1 nm to 20 nm, or about 1 nm to 10 nm in diameter. In another embodiment, the core can be an IIB-VIA semiconductor and can be about 2 nm to 10 nm in diameter. For example, the core can be CdS, CdSe, CdTe, ZnSe, ZnS, ZnS:Ag, ZnO:Ag, PbS, PbSe, or an alloy such as $Cd_xZn_{1-x}Se_yTe_{1-y}$, where x is a variable from one to zero and y is variable from about one to zero. In an embodiment the core is CdTe.

The "cap" or "shell" may be a semiconductor or insulator that differs from or is the same as the semiconductor or insulator of the core and binds to the core, thereby forming a surface layer on the core. A shell can differ from the core and/or other shells by means of its chemical composition, and/or the presence of one or more dopants, and/or different amounts of a given dopant. The shell typically passivates the core by having a higher band gap than the core, and having an energy offset in the top of the valence band and bottom of the conduction band such that electrons and/or holes may be confined to the core by the shell. Each shell encloses, partially (e.g., about 50% or more, about 60% or more, about 70% or more, about 80% or more, about 90% or more, about 95% or more, about 99% or more) or totally, the adjacent shell closer to the core. In one embodiment, the shell can be a IIB-VIA semiconductor of high band gap. For example, the shell can be ZnS or CdS on a core of $CdSe_xTe_{1-x}$ (y is variable from about one to zero). Other combinations of the core and shell can include, but are not limited to, the shell is ZnS when the core is CdSe or CdS, and the shell is CdS when the core is CdSe. In an embodiment, the shell may also be an organic film, such as silicones, thiophenes, trioctylphosphine, trioctylphosphine oxide, or a combination thereof. Other exemplary NP's include, but are not limited to, CdS, ZnSe, ZnS:Ag, ZnS:Cu, ZnO, CdSe, CdTe, $CdSe_xTe_{1-x}$ (x is variable from about one to zero), InAs, InP, PbTe, PbSe, PbS, HgS, HgSe, HgTe, CdHgTe, and GaAs. The thickness of the shell can be about 0.1 to 20 nm, about 0.1 to 5 nm, or about 0.1 to 2 nm covering the core.

III. Experimental Measurements

FIG. 1A (left) shows room lighting images illustrating surfactant free gel particles on the left and micro-emulsion synthesized glow particles on the right. FIG. 1B (right) shows UV-excitation image showing the fluorescence of surfactant free gel particles on the left and micro-emulsion synthesized gel particles on the right FIG. 2A shows high resolution transmission electron microscopy (HRTEM) images showing 5 nm sized gel particles. Selective area electron diffraction (SAED) shows the crystallinity and lattice plane spacings. FIG. 2B shows electron dispersion x-ray (EDX) spectroscopy confirming the particle composition of ZnS:Mn gel particles on a carbon coated copper grid.

Figure 3A:
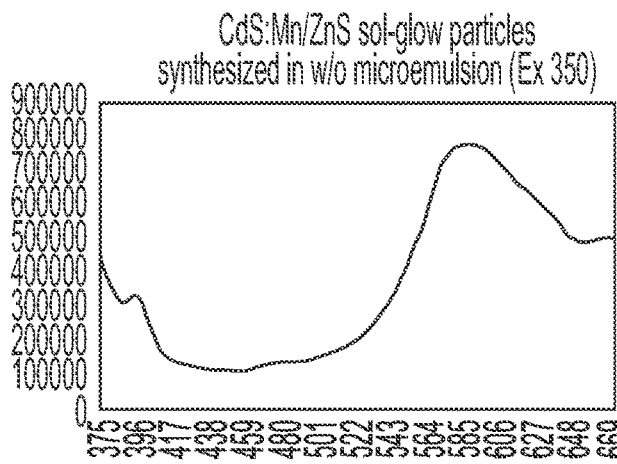
FIG. 3A and FIG. 3B shows fluorescence emission of CdS:Mn/ZnS and ZnS:Mn gel particles measured using a NanoLog spectrofluorimeter (SPEX, Jobin Yvon Horiba) without a neutral density filter. Spectra were collected for washed gel particles that were removed from a microemulsion and redispersed in water.
Figure 3B:
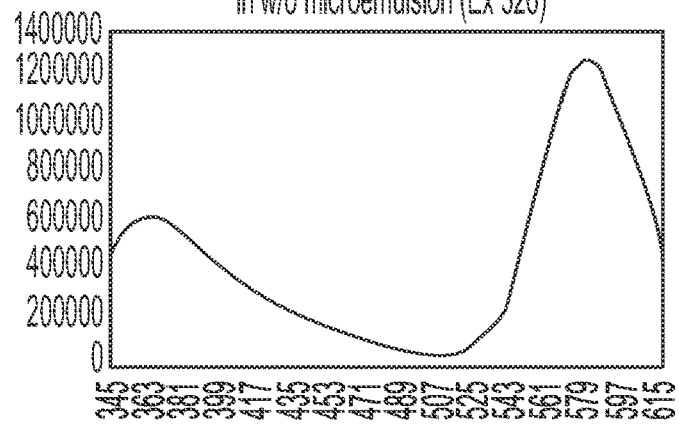

FIG. 3A and FIG. 3B shows fluorescence emission of CdS:Mn/ZnS and ZnS:Mn/ZnS gel particles measured using a NanoLog spectrofluorimeter (SPEX, Jobin Yvon Horiba) without a neutral density filter. Spectra were collected for washed gel particles that were removed from a microemulsion and redispersed in water.

Figure 4A:
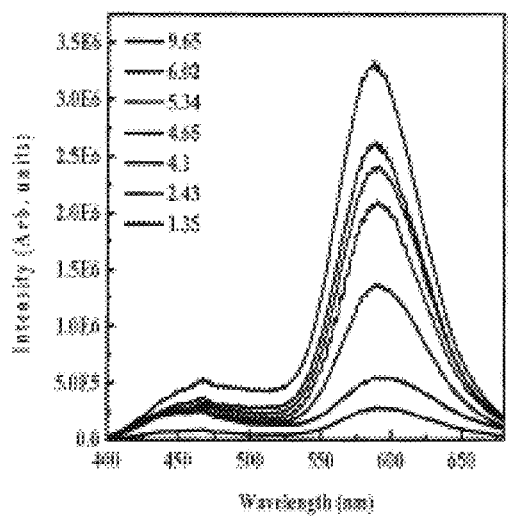
FIG. 4A and FIG. 4B show fluorescence activation of CdS:Mn/ZnS semiconductor material, and increasing intensity with decreasing pH. Fluorescence intensity was measured using the NanoLog spectrofluorimeter (SPEX, Jobin Yvon Horiba) with a neutral density filter. The spectral curves at 600 nm follow in an inverse order with respect to the legend, with the exception that pH 6.02 is the lowest curve.
Figure 4B:
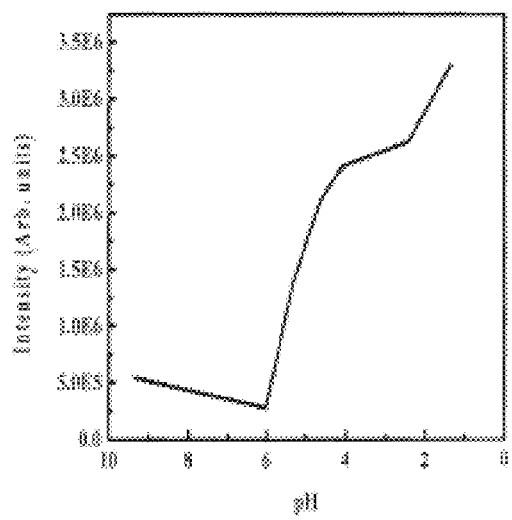

FIG. 4A and FIG. 4B show fluorescence activation of CdS:Mn/ZnS semiconductor and increasing intensity with decreasing pH. Fluorescence intensity was measured using the NanoLog spectrofluorimeter (SPEX, Jobin Yvon Horiba) with a neutral density filter.

Figure 5A:
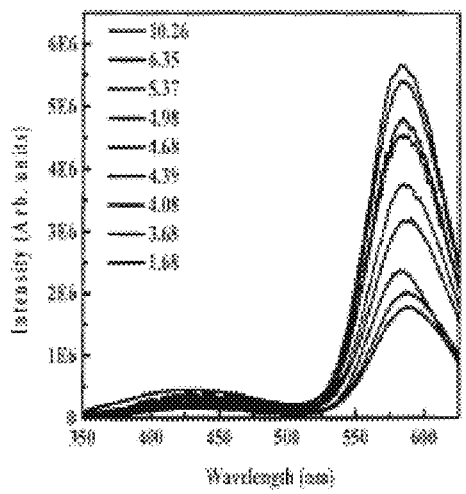
FIG. 5A and FIG. 5B show fluorescence activation of ZnS:Mn semiconductor material, and increasing intensity with decreasing pH. Fluorescence intensity was measured using the NanoLog spectrofluorimeter (SPEX, Jobin Yvon Horiba) with a neutral density filter. The spectral curves at 600 nm in increasing intensity correspond with pH 10.26, 6.35, 1.68, 5.37, 4.98, 4.68, 4.39, 4.08 and 3.68.
Figure 5B:
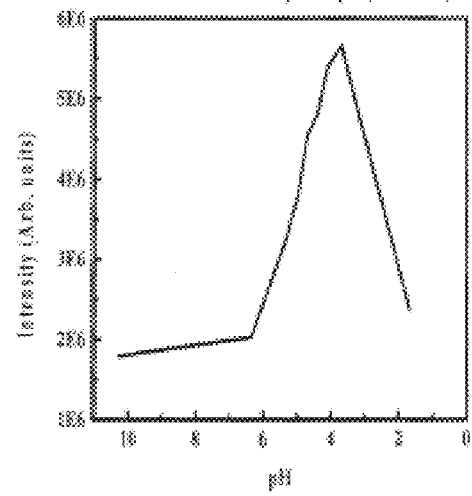

FIG. 5A and FIG. 5B show fluorescence activation of ZnS:Mn semiconductor and increasing intensity with decreasing pH. Fluorescence intensity was measured using the NanoLog spectrofluorimeter (SPEX, Jobin Yvon Horiba) with a neutral density filter.

Figure 6A:
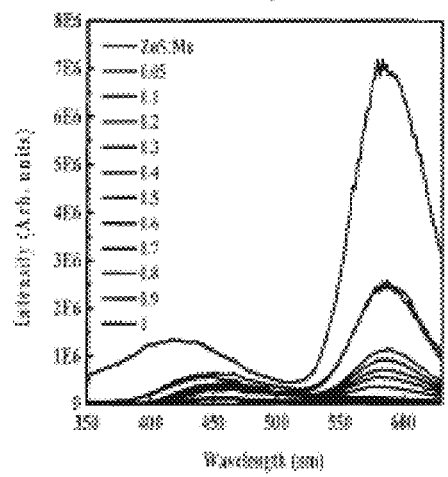
FIG. 6A and FIG. 6B show fluorescence quenching of ZnS:Mn semiconductor material with increasing $H_2O_2$ concentration showing a slow oxidation of ZnS semiconductor material to ZnO. Fluorescence intensity was measured using the NanoLog spectrofluorimeter (SPEX, Jobin Yvon Horiba). A neutral density filter was used only to measure the initial gel particle fluorescence before hydrogen peroxide addition. The spectral curves at 600 mn correspond in direct order with respect to the legend.
Figure 6B:
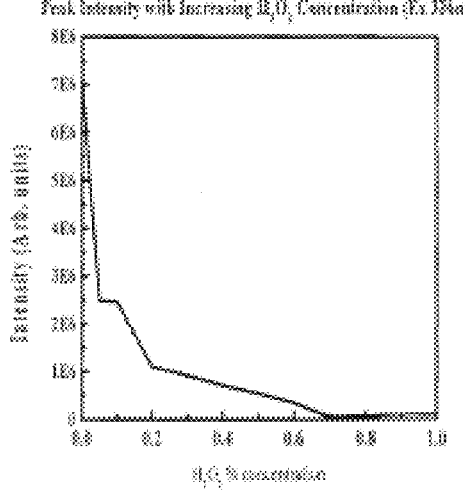

FIG. 6A and FIG. 6B show fluorescence quenching of ZnS:Mn semiconductor with increasing $H_2O_2$ concentration showing a slow oxidation of ZnS semiconductor to ZnO. Fluorescence intensity was measured using the NanoLog spectrofluorimeter (SPEX, Jobin Yvon Horiba). A neutral density filter was used only to measure the initial gel particle fluorescence before hydrogen peroxide addition.

Figure 7A:
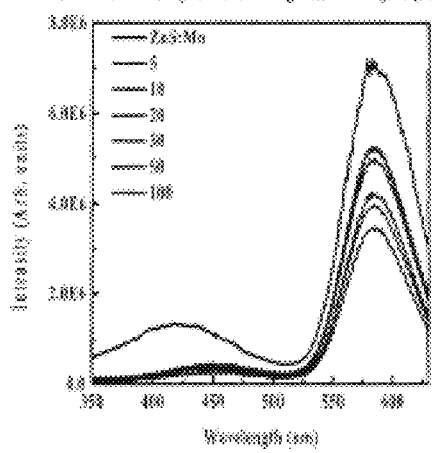
FIG. 7A and FIG. 7B show fluorescence quenching of ZnS:Mn semiconductor material with increasing Quat surfactant volume showing the slow coating of ZnS:Mn semiconductor material to ZnS:Mn/Quat. A neutral density filter was used only to measure the initial gel particle fluorescence before Quat addition. The spectral curves at 600 nm in increasing intensity correspond with 10, 20, 5, 50, 100 and zero parts Quat.
Figure 7B:
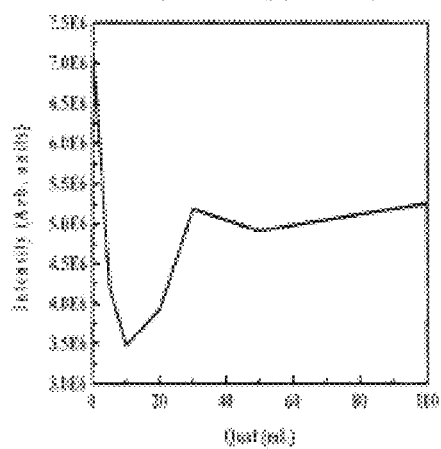

FIG. 7A and FIG. 7B show fluorescence quenching of ZnS:Mn semiconductor with increasing Quat surfactant volume showing the slow coating of ZnS:Mn semiconductor to ZnS:Mn/Quat. A neutral density filter was used only to measure the initial gel particle fluorescence before Quat addition.

Figure 8:
FIG. 8 shows 200 ml large scale synthesis of surface modified surfactant free gel particles showing long term shelf life and water solubility. Sodium salicylate (SS), TEOS (TE), and sodium gluconate (SG) were incorporated as solubilizing agents.

FIG. 8 shows 200 ml large scale synthesis of surface modified surfactant free gel particles showing long term shelf life and water solubility. Sodium salicylate (SS), TEOS (TE), and sodium gluconate (SG) were incorporated as solubilizing agents.

Figure 9:
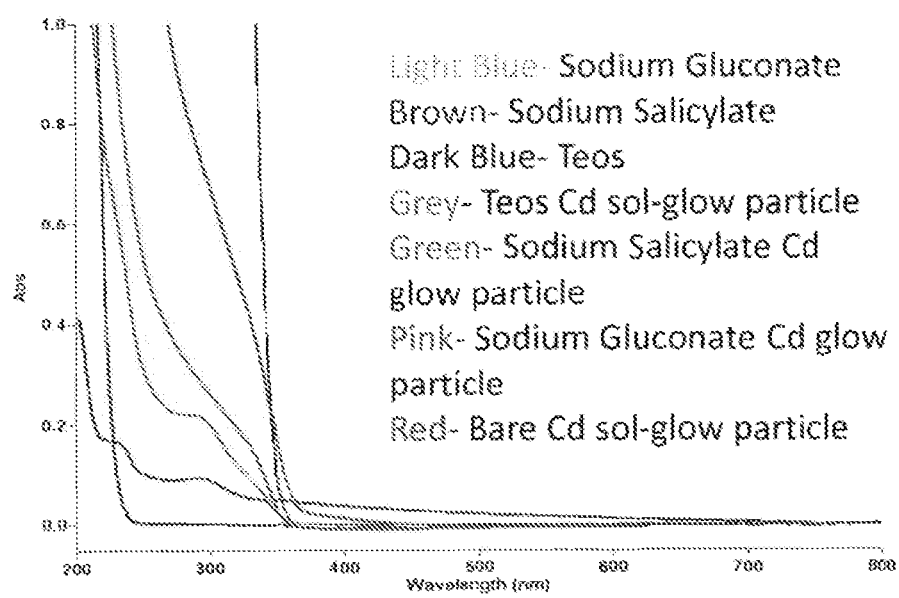
FIG. 9 Shows UV-visible absorbance of CdS:Mn/ZnS gel particle coated with TEOS (silica), sodium salicylate and sodium gluconate was collected using a Cary 300 UV-visible spectrophotometer. Respective controls are included for comparison. Bare sol-gel particles were diluted appropriately in order to obtain an absorbance of 0.1 at 350 nm. Coating agents improve gel particle solubility as noted by the reduced light diffraction between bare and coated gel particles. The spectral curves at 0.4 absorbance from left to right are dark blue, light blue, green, gray, pink, red and brown.

FIG. 9 Shows UV-visible absorbance of CdS:Mn/ZnS gel particle coated with TEOS (silica), sodium salicylate and sodium gluconate was collected using a Cary 300 UV-visible spectrophotometer. Respective controls are included for comparison. Bare sol-gel particles were diluted appropriately in order to obtain an absorbance of 0.1 at 350 nm. Coating agents improve gel particle solubility as noted by the reduced light diffraction between bare and coated gel particles.

Figure 10:
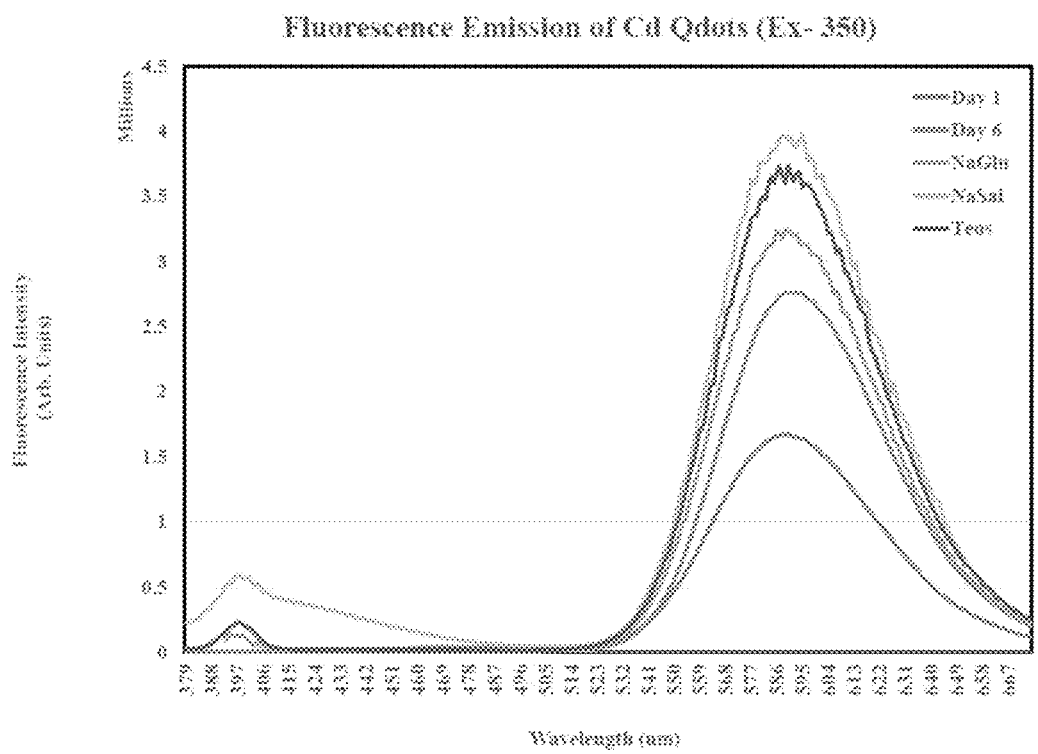
FIG. 10 shows fluorescence emission of CdS:Mn/ZnS semiconductor material showing the maturation of the sol-glow particle and $Mn^{2+}$ dopant environment as fluorescence increased between Day 1-Day 6. In addition, relative fluorescence emissions for sodium gluconate, sodium salicylate, and TEOS coated gel particles are provided. The spectral curves at 600 nm follow inversely with respect to the legend, with the exception that sodium salicylate is uppermost.

FIG. 10 shows fluorescence emission of CdS:Mn/ZnS semiconductor showing the maturation of the sol-gel particle and $Mn^{2+}$ dopant environment as fluorescence increased between Day 1-Day 6. In addition, relative fluorescence emissions for sodium gluconate, sodium salicylate, and TEOS coated gel particles.

Figure 11:
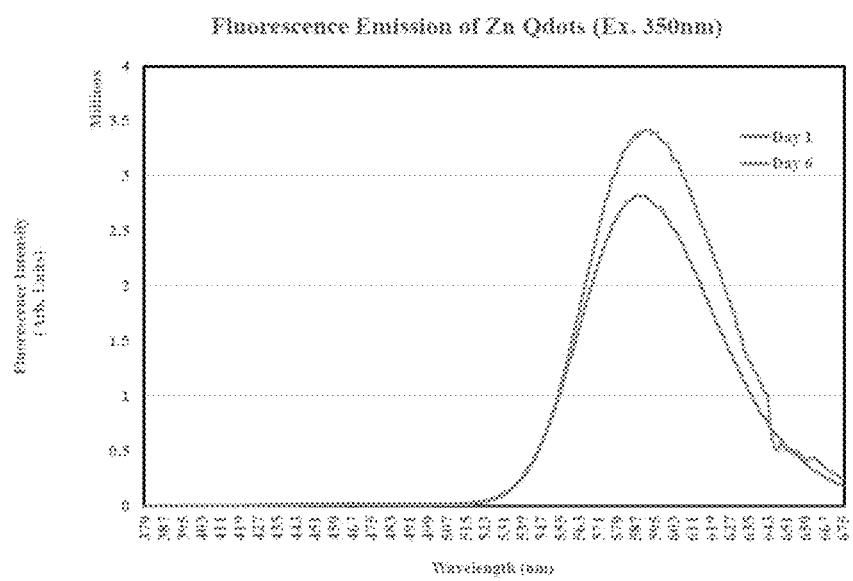
FIG. 11 shows fluorescence emission of ZnS:Mn semiconductor material showing the maturation of the gel particle and $Mn^{2+}$ dopant environment as fluorescence increased between Day 1-Day 6.

FIG. 11 shows fluorescence emission of ZnS:Mn semiconductor showing the maturation of the gel particle and $Mn^{2+}$ dopant environment as fluorescence increased between Day 1-Day 6.

Figure 12A:
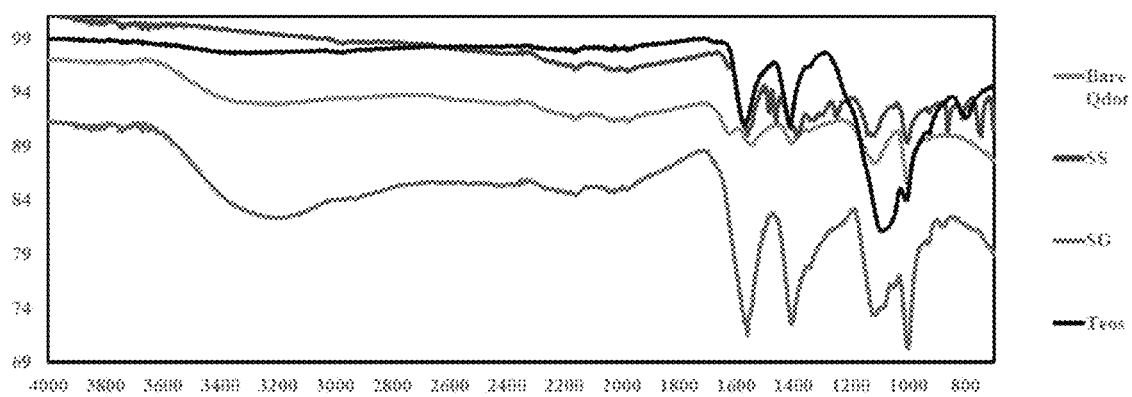
FIG. 12A shows Fourier transform infrared (FTIR) spectra of bare and coated fluorescent gel particles. The spectral curves at 3200 wavenumbers in increasing intensity correspond with sodium gluconate, bare Q-dot, TEOS and sodium salicylate.
Figure 12B:
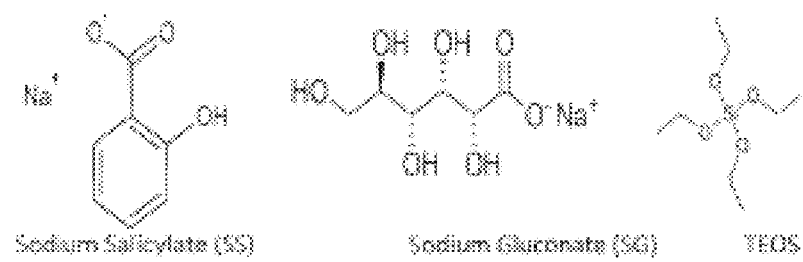
FIG. 12B shows chemical structures of the coating materials indicted above.

FIG. 12 shows FTIR spectra of base and coated fluorescent emitter gel particles.

Figure 13:
FIG. 13 shows ambient light image of water soluble ZnS:Mn gel nanoparticles (FIG. A) showing (from left to right) glutathion (GSH) coated, N-acetyl cysteine (NAC) coated, sodium gluconate (SG) coated, NAC/GSH co-coated, NAC-fluoresceins isothiocyanate (FllC) coated, and bare uncoated. Same samples showing fluorescence emission under 254 nm excitation (FIG. B) and 365 nm excitation (FIG. C).

FIG. 13 shows ambient light image of water soluble ZnS:Mn gel nanoparticles (FIG. A) showing (from left to right) glutathion (GSH) coated, N-acetyl cysteine (NAC) coated, sodium gluconate (SG) coated, NAC/GSH co-coated, NAC-fluoresceine isothiocyanate (FllC) coated, and bare uncoated. Same samples showing fluorescence emission under 254 nm excitation (FIG. B) and 365 nm excitation (FIG. C).

Figure 14:
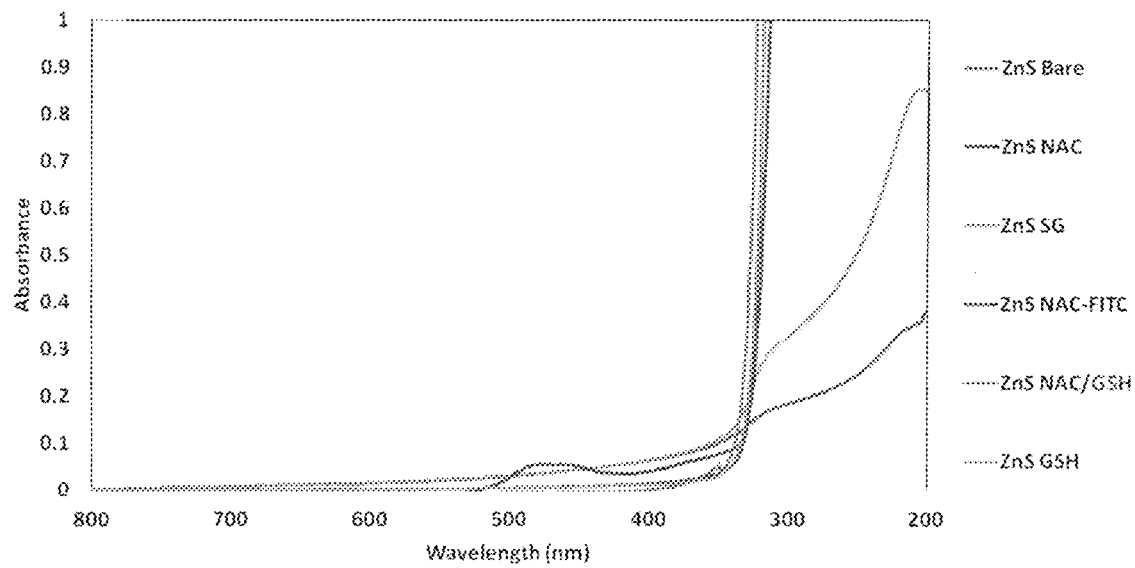
FIG. 14 shows UV visible absorbance spectra of water soluble ZnS gel Q-dots at 326 nm excitation. ZnS bare (blue) at pH 1. ZnS NAC (red, N-acetyl cysteine) at pH 9.26, ZnS SG at pH 5.6 (green, sodium gluconate), ZnS NAG-FITC at pH 9 (purple, fluoresceine isothiocyanate), ZnS NAC/GSH (light blue, co-coated with NAC and glutathione), and ZnS GSH pH 8 (orange) have all been standardized to 0.1 absorbance at 326 nm using a CaryWin UV Spectrophotometer, Peak absorbance at 490 nm indicates the presence of FITC on the ZNS NAC-FITC Q-dot. At 200 nm the ZnS SG absorbs about 0.85 and the ZnS bare absorbs about 0.38. The remainder of the ZnS compositions provide extinction of light at about 300 nm
Figure 15:
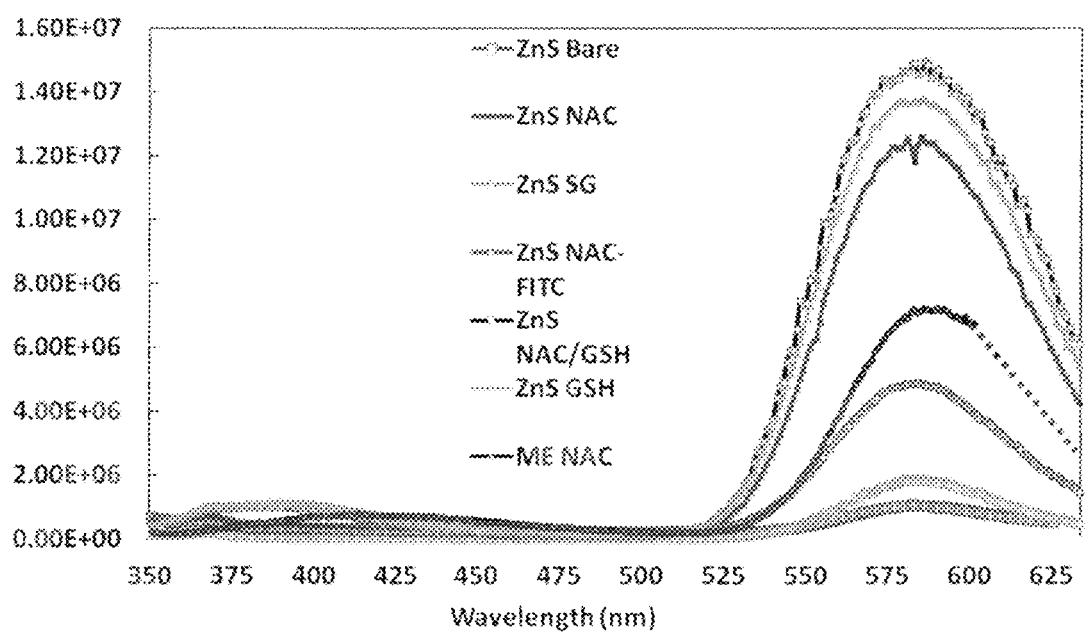
FIG. 15 shows peak fluorescence emission of water soluble ZnS gel Q-dots at 326 nm excitation. ZnS Bare (Blue) at pH 1. ZnS NAC (red, N-acetyl cysteine) at pH 9.26, ZnS SG at pH 5.6 (green, sodium gluconate ZnS NAC-FITC at pH 9 (purple, fluoresceine isothiocyanate ZnS NAC/GSH (black, co-coated with NAC and glutathione ZnS GSH pH 8 (orange), and ME NAC pH 5.6 (dark blue, ZnS Q-dots prepared in w/o micro emulsion) have all been standardized to 0.1 absorbance at 326 nm using a CaryWin UV Spectrophotometer. ME NAC included as a comparison example. In order of decreasing absorbance at 600 nm is bare, GSH, NAC, NAC-GSH, AC-FITC SG and ME-NAC FIG. 16 shows fluorescence emission of ZnS NAC-FITC (N-acetyl cysteine linked fluoresceine isothiocyanate) with 400 nm excitation showing the 510 nm emission of FITC confirming the presence of an organic dye on the Q-dot.
Figure 16:
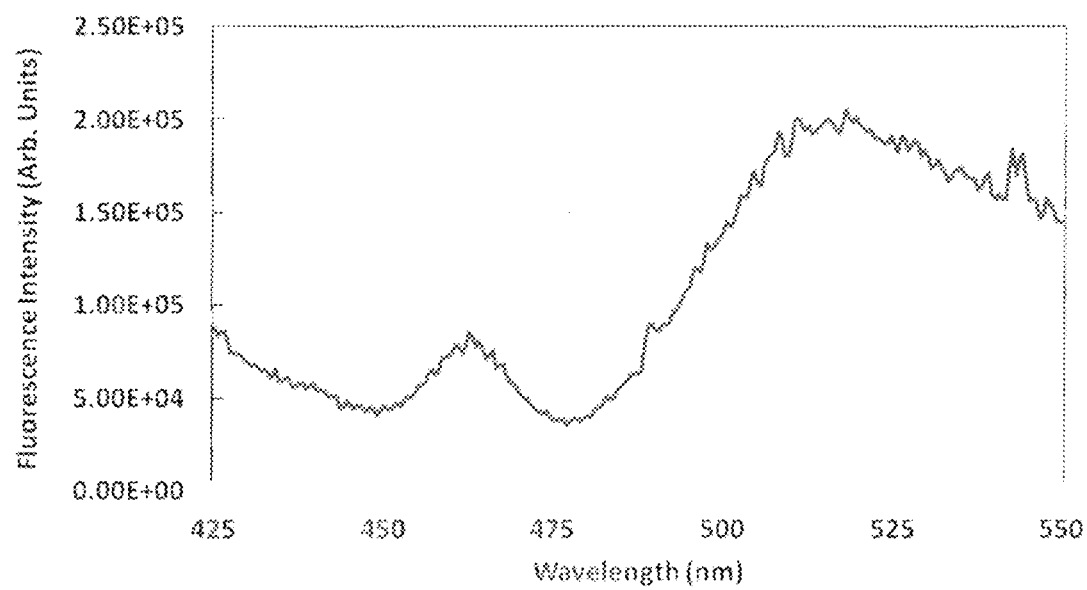

FIG. 14 shows UV visible absorbance spectra of water soluble ZnS gel Q-dots at 326 nm excitation. ZnS bare (blue) at pH 1. ZnS NAC (red, N-acetyl cysteine) at pH 9.26, ZnS SG at pH 5.6 (green, sodium gluconate), ZnS NAC-FITC at pH 9 (purple, fluoresceine isothiocyanate), ZnS NAC/GSH (light blue, co-coated with NAC and glutathione), and ZnS GSH pH 8 (orange) have all been standardized to 0.1 absorbance at 326 nm using a CaryWin UV Spectrophotometer. Peak absorbance at 490 nm indicates the presence of FITC on the ZNS NAC-FITC Q-dot. At 200 nm the ZnS SG absorbs about 0.85 and the ZnS bare absorbs about 0.38. The remainder of the ZnS compositions provide extinction of light at about 300 nm FIG. 15 shows peak fluorescence emission of water soluble ZnS gel Q-dots at 326 nm excitation. ZnS Bare (Blue) at pH 1. ZnS NAC (red, N-acetyl cysteine) at pH 9.26, ZnS SG at pH 5.6 (green, sodium gluconate ZnS NAC-FITC at pH 9 (purple, fluoresceine isothiocyanate ZnS NAC/GSH (black, co-coated with NAC and glutathione ZnS GSH pH 8 (orange), and ME NAC pH 5.6 (dark blue, ZnS Q-dots prepared in w/o microemulsion) have all been standardized to 0.1 absorbance at 326 nm using a CaryWin UV Spectrophotometer. ME NAC included as a comparison example. In order of decreasing absorbance at 600 nm is bare, GSH, NAC, NAC-GSH, AC-FITC SG and ME-NAC FIG. 16 shows fluorescence emission of ZnS NAC-FITC (N-acetyl cysteine linked fluoresceine isothiocyanate) with 400 nm excitation showing the 510 nm emission of FITC confirming the presence of an organic dye on the Q-dot and thus providing a light sensitive particle that includes a metal dopant inorganic semiconductor light sensitive component and an organic fluorescent dye light sensitive component.

Figure 17:
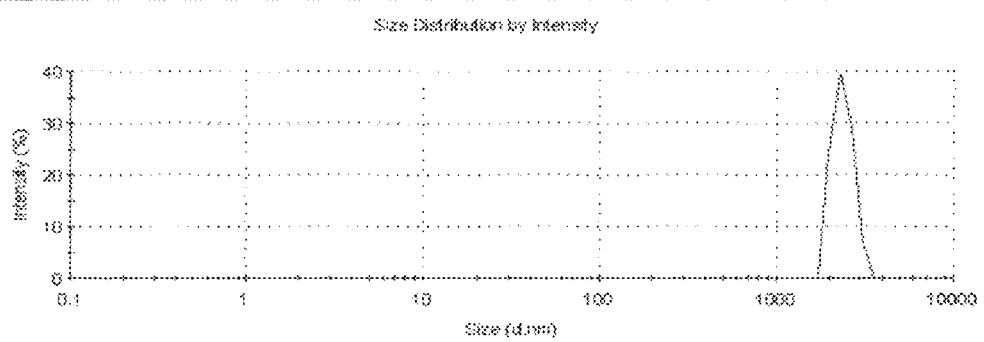
FIG. 17 shows dynamic light scattering (DLS) of bare ZnS Q-dots dispersed in water at neutral pH showing micron-sized particles. Average Zeta potential is 10.77 mV
Figure 18:
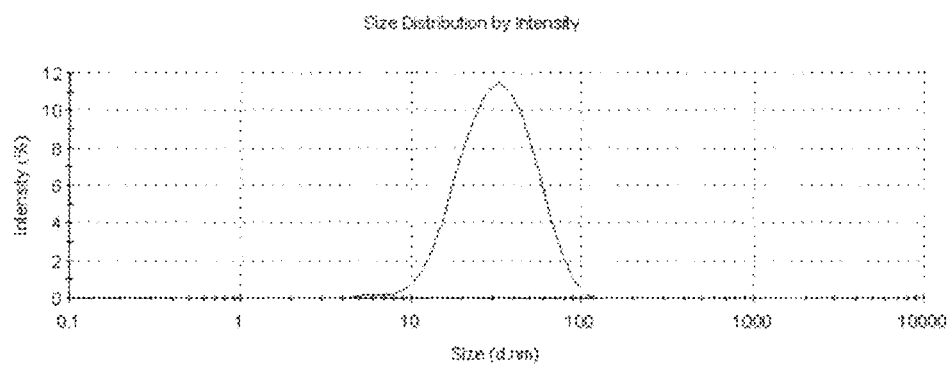
FIG. 18 shows dynamic light scattering (DLS) of coated ZnS NAC Q-dots solubilized in water at pH 9.26 showing an average particle size of 35.28 nm. Average Zeta potential was −15.87 mV.

FIG. 17 shows dynamic light scattering (DLS) of bare ZnS Q-dots dispersed in water at neutral pH showing micron-sized particles. Average Zeta potential is 10.77 mV FIG. 18 shows dynamic light scattering (DLS) of coated ZnS NAC Q-dots solubilized in water at pH 9.26 showing an average particle size of 35.28 nm. Average Zeta potential was −15.87 mV.

Figure 19:
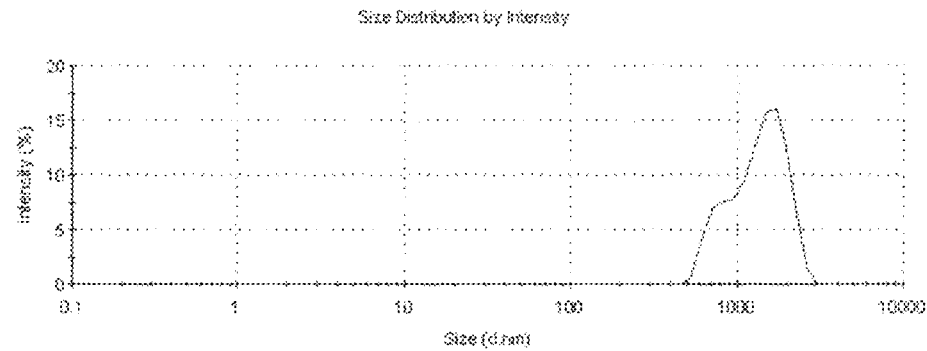
FIG. 19 shows dynamic light scattering (DLS) of coated ZnS sodium gluconate Q-dots solubilized in water at pH 5.6 showing an average particle size of 1407 nm. Average Zeta potential was −30.13

FIG. 19 shows dynamic light scattering (DLS) of coated ZnS sodium gluconate Q-dots solubilized in water at pH 5.6 showing an average particle size of 1407 nm. Average Zeta potential was −30.13

Figure 20:
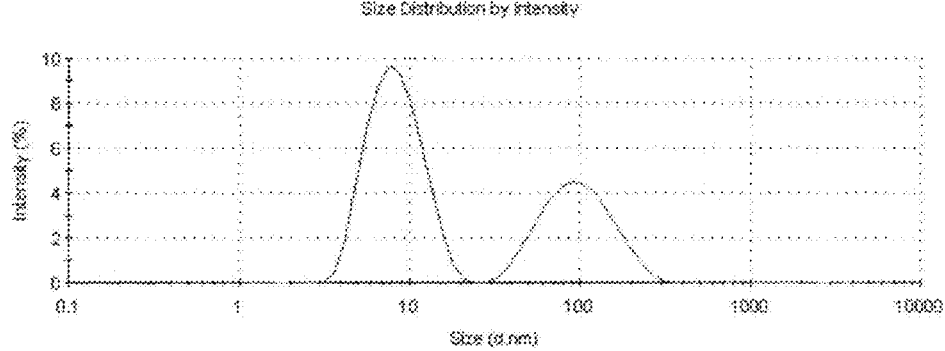
FIG. 20 shows dynamic Light Scattering (DLS) of coated ZnS NAC/GSH Q-dots solubilized in water at 9.26 showing average particle sizes ranging from 8.6 nm to 104 nm.

FIG. 20 shows dynamic Light Scattering (DLS) of coated ZnS NAC/GSH Q-dots solubilized in water at pH 9.26 showing average particle sizes ranging from 8.6 nm to 104 nm.

Figure 21:
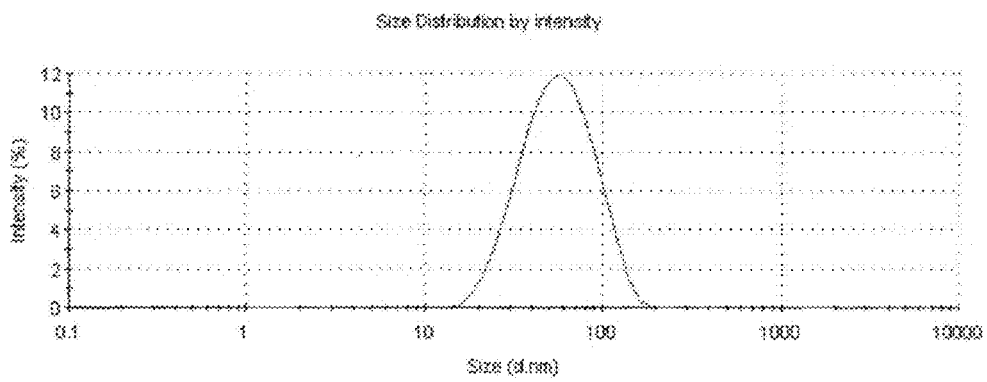
FIG. 21 shows dynamic light scattering (DLS) of coated ZnS GSH Q-dots solubilized in water at pH 8 showing an average particle size of 60.80 nm.

FIG. 21 shows dynamic light scattering (DLS) of coated ZnS GSH Q-dots solubilized in water at pH 8 showing an average particle size of 60.80 nm.

Figure 22:
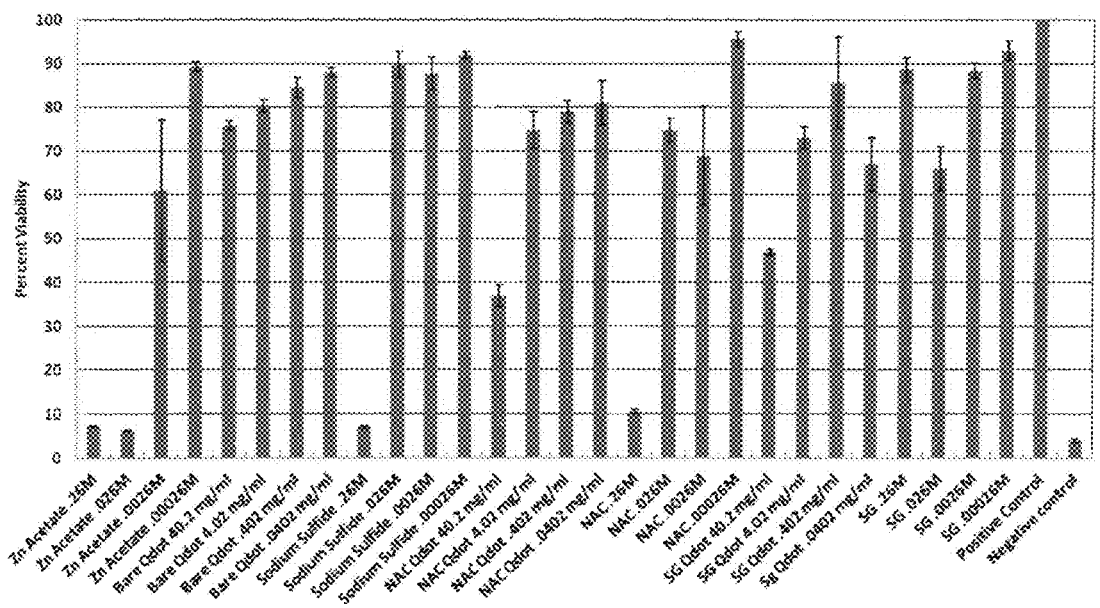
FIG. 22 shows cytotoxicity assay using Alamar Blue, showing the toxic impact of the water soluble Q-dots on macrophage cells compared to individual components. Positive control includes only growth media. Negative control has deionized water instead of growth media to signify cell death.

FIG. 22 shows cytotoxicity assay using Alamar Blue, showing the toxic impact of the water soluble Q-dots on macrophage cells compared to individual components. Positive control includes only growth media. Negative control has deionized water instead of growth media to signify cell death.

Figure 23:
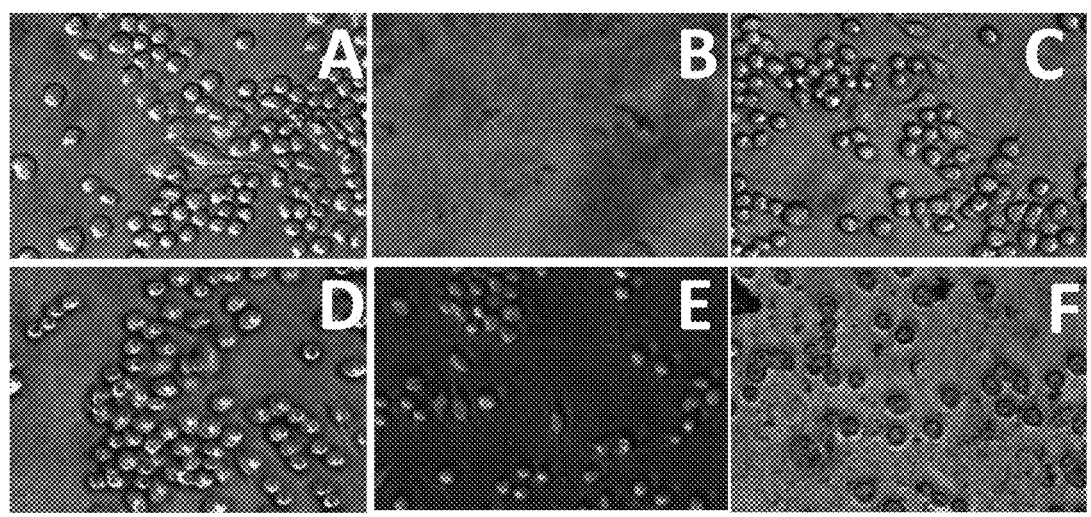
FIG. 23 shows cytotoxicity assay using Alamar Blue, showing the toxic impact of the water soluble Q-dots on macrophage cells compared to individual components. Positive control includes only growth media (FIG. A). Negative control (FIG. B) has deionized water instead of growth media to signify cell death. Bare Q-dots incubated with macrophage cells (FIG. C), NAC Q-dots incubated with macrophage cells (FIG. D), and sodium gluconate coated Q-dots incubated with macrophage cells (FIG. E) all showing negative cytotoxic effects as there are many cells preparing for cell division. FIG. F, shows the toxic impact of just Zn acetate alone where many cells have lost their projections and cell fragments are present in the surrounding media.

FIG. 23 shows cytotoxicity assay using Alamar Blue, showing the toxic impact of the water soluble Q-dots on macrophage cells compared to individual components. Positive control includes only growth media (FIG. A). Negative control (FIG. B) has deionized water instead of growth media to signify cell death. Bare Q-dots incubated with macrophage cells (FIG. C), NAC Q-dots incubated with macrophage cells (FIG. D), and sodium gluconate coated Q-dots incubated with macrophage cells E) all showing negative cytotoxic effects as there are many cells preparing for cell division. FIG. F, shows the toxic impact of just Zn acetate alone where many cells have lost their projections and cell fragments are present in the surrounding media.

IV. Particulate Preparation

Table I shows a comparison of various characteristics for Q-dot particles produced using conventional methods, and in accordance with the embodiments.

TABLE I

Comparison of Methods for Fluorescent Particle Preparation

| Qdot synthesis parameters and optical properties | CdS:Mn/ZnS or ZnS:Mn/ZnS (W/O Microemulsion) | CdSe (Hot Phase synthesis) | CuInS/ZnS (Hot-phase synthesis; another example - alloy core based) | Sol-Glow |
|---|---|---|---|---|
| Temperature conditions | Room Temperature | High Temperature (>150 degree C.) | High Temperature (>150 degree C.) | Room Temperature |
| Inert synthesis conditions required? | No | Yes | Yes | Not required |
| Use of surfactant? | Yes | Yes | Yes | Surfactant free |
| Use of mixed solvents? | Yes | Yes | Yes | No (water-based) |
| Time Sensitive? | Yes | Yes | Yes | No |
| Time Consuming? (tedious) | Yes | Yes | Yes | No |

TABLE I-continued

Comparison of Methods for Fluorescent Particle Preparation

| Qdot synthesis parameters and optical properties | CdS:Mn/ZnS or ZnS:Mn/ZnS (W/O Microemulsion) | CdSe (Hot Phase synthesis) | CuInS/ZnS (Hot-phase synthesis; another example - alloy core based) | Sol-Glow |
|---|---|---|---|---|
| Use of non-aqueous solvents? | Yes | Yes | Yes | No |
| Further surface modification (for bioconjugation, improving solubility etc) possible? | Yes | Yes | Yes | Yes |
| High quality crystals? | Yes | Yes | Yes | Yes |
| Size-tunable emission property? | Limited (dopant based emission) | Yes | Yes | Limited (dopant based emission) |
| Photostable? | Yes | Yes | Yes | Yes |
| Fluorescently bright? | Yes | Yes | Yes | Yes |

V. Specific Preparation Methods for Q-Dot Particles

1. Water-in-Oil (W/O) Micro-Emulsion Preparation of CdS:Mn/ZnS and ZnS:Mn/ZnS Q-Dots
   A. Supplies
   3 conical flasks (regular washed, acid washed, base washed, rinsed, dried.)
   3 magnetic stir bars (clean)
   3 glass vials w/caps
   burette
   cadmium acetate dihydrate (MW 266.52)
   zinc acetate dehydrate 99.999+% (MW 219.5 g)
   manganese acetate tetrahydrate (MW 245.09 g)
   sodium sulfide (MW 78.04)
   dioctyl sulfosuccinate sodium salt [AOT] (MW 444.55 g)
   heptane (MW 100.21 g)
   deionized water
   B. Solvent Ratios
   AOT:heptane—0.0892
   water:heptane—0.036
   C. Stock Preparation
   Stock Solution 1
      266 mg cadmium acetate dihydrate (0.1 mol) or 219 mg zinc acetate dihydrate for ZnS:Mn/ZnS synthesis
      4.9 mg manganese acetate or 3.9 mg for ZnS:Mn/ZnS (1.8% of core metal mass)
      mix in 10 ml DI water in glass vial until dissolved
   Stock solution 2
      257.5 mg sodium sulfide (0.66 mol)
      mix in 5 ml DI water in glass vial until dissolved
   Stock solution 3
      285.25 mg zinc acetate dihydrate (0.26 mol)
      mix in 5 ml DI water in glass vial until dissolved
   Flask A
      25 ml heptane
      2.23 g AOT
      mix in conical flask with magnetic stir bar until AOT is dissolved (~15 min) and cover from light with aluminum foil
   Flask B
      75 ml heptane
      6.69 g AOT
      mix in conical flask with magnetic stir bar until AOT is dissolved (~15 min) and cover from light with aluminum foil
   Flask C
      75 ml heptane
      6.69 g AOT
      mix in conical flask with magnetic stir bar until AOT is dissolved (~15 min) and cover from light with aluminum foil
   D. Synthesis (briefly sonicate all stock solutions prior to mixing with the AOT/Heptane mixture)
      add 2.7 ml of stock solution 2 into Flask B and stir for 1 hour (wait 30 min and then move to step 2)
      add 0.9 ml of stock solution 1 into Flask A and stir for 30 min (wait 15 min and then move to step 3)
      both solutions should finish stirring at the same time
      add 2.7 ml of stock solution 3 into Flask C dropwise and let stir for 30 min.
      when Flask A and B have finished mixing, pour Flask A into Flask B (a yellow color change will occur for CdS:Mn/ZnS Q-dot) and mix for 15 min (Flask A+B)
      all solutions must finish mixing at the same time
      using the burette, add Flask C to mixed Flask A+B at a rate of 1-2 ml/min (very important)
      observe fluorescence using a handheld UV light source and securely cover with foil for 24 hours
      color should be a bright yellow to yellow-orange color.
   E. Washing
      Transfer desired volume of quantum dot (Q-dot) microemulsion (ME) into centrifuge tube and add twice that volume containing acetone/ethanol mixture (1:1 v/v) Centrifuge at 11,000 rpm for 10 min and remove nonfluorescent supernatant.
      Disperse fluorescent pellet in acetone (equal volume to withdrawn Q-dot ME) via vortexing and sonication.
      Repeat steps 2 and 3 three times
      Disperse fluorescent pellet in heptane and repeat step 2
      Repeat step 5 and 2
      Disperse fluorescent pellet in Acetone and repeat step 2
      Decant acetone and evaporate excess acetone using a hot water bath.
      Disperse washed particles in water (Note—~80% of the surfactant will be removed)

2. Sol-Gel Preparation of CdS:Mn/ZnS and ZnS:Mn in Accordance with Embodiments
   A. Supplies
   glass vials w/caps
   cadmium acetate dihydrate (MW 266.52)
   zinc acetate dehydrate 99.999+% (MW 219.5 g)

manganese acetate tetrahydrate (MW 245.09 g)
sodium sulfide (MW 78.04)
6N hydrochloric acid
6N NaOH (Optional)
deionized water B. Stock Preparation Stock solution 1
- 266 mg cadmium acetate dihydrate (0.1 mol) or 219 mg zinc acetate dihydrate for ZnS:Mn/ZnS synthesis
- 4.9 mg manganese acetate or 3.9 mg for ZnS:Mn/ZnS (1.8% of core metal mass)
- mix in 10 ml DI water in glass vial until dissolved Stock solution 2
- 257.5 mg sodium sulfide (0.66 mol)
- mix in 5 ml DI water in glass vial until dissolved Stock solution 3
- 285.25 mg zinc acetate dihydrate (0.26 mol)
- mix in 5 ml DI water in glass vial until dissolved C. Preparation (Briefly Sonicate all Stock Solutions Prior to Combination)
- using a glass container (beaker, flask, vial) combine 2.7 ml of stock solution 3 and 0.9 ml of stock solution 1 and briefly mix
- add 2.7 ml of stock solution 2 dropwise while mixing
- lower the pH to between 6-3 by adding 200-400 µL of 6N HCl dropwise (optimal fluorescence is achieved at lower pH)
- (optional) if necessary, adjusting pH to neutral after achieving optimal fluorescence can be done using 6N NaOH D. Purification—for further modification/use, particles can be washed to remove excess salt centrifuge at 11,000 rpm for 5 min, decant nonfluorescent supernatant, disperse in deionized water 3. CdSe Q-Dot Hot Phase Preparation
  1. Reference: Evan R. Trivedi and Shelby L. Hatch. "Synthesis and Size Dependent Properties of CdSe Quantum Dots," Department of Chemistry, Northwestern University, n.d. Web. 12 May 2013.
  2. Preparation Sequence
     a. Prepare Se stock solution by dissolving Se beads in 1-octadecene with trioctylphosphine. It takes-3 hrs at high temperature for the Se beads to dissolve
     b. To a 25 mL round-bottom flask, add a magnetic stir bar and 13 mg CdO (CdO should be prepackaged in 13 mg portions).
     b. Add 0.6 mL oleic acid and 10 mL 1-octadecene to the round-bottom.
     c. Clamp the round-bottom flask into the metal heating mantle on the hot plate. Place a thermometer into the heating mantle. Do not allow the thermometer to heat up beyond the maximum temperature reading (~250° C.)
     d. Turn on the heat and magnetic stirring.
     e. When the Se stock solution is added, aliquots must be removed every 30 seconds.
     f. Monitor the reaction mixture carefully and add 1 mL Se stock solution when all of the CdO has dissolved (solution should be clear to pale yellow).
     g. Remove aliquots (~1 mL) every 30 seconds with the glass pipets.
     h. Continue collection for about three minutes or until the solution no longer changes color.
     i. Turn off heat and remove the round-bottom flask from the heating mantle. If the flask is allowed to cool while on the heating mantle, it will break.
     j. Irradiate the quantum dot solutions with UV light and make observations.

4. Hot Phase CuInS/ZnS Q-Dot Synthesis
Reference: Woo-Seuk Song and Heesun Yang, Efficient White-Light-Emitting Diodes Fabricated from Highly Fluorescent Copper Indium Sulfide Core/Shell Quantum Dots. *Chemistry of Materials* 2012 24 (10), 1961-1967

Materials <Aldrich Product number>
1. Cu iodide: 215554
2. In acetate: 510270
3. DDT: 471364
4. ODE: 0806
5. Zn stearate: 26423
6. Three neck flask
7. Hot plate
8. Syringes
9. Argon Gas Preparation
CIS (Cu:In=1:4) core Q-dots
1. Cu iodide→0.125 mmol (0.024 g)
2. In acetate→0.5 mmol (0.146 g)
3. DDT→5 mL
Loading in 50 mL of three neck flask
Preparation of ZnS shell solution
1. Zn stearate 4 mmol (2.528 g)
2. 1-octadecene 4 mL
3. DDT 1 mL
4. Heat on hot plate at 190° C., then use it as shell solution Synthesis
1. Heat contents in 50 mL flask at 100° C. for 30 min
2. Quickly Heat to 230° C. within 10 min under a purge with Ar atmosphere and keep at that temperature for 5 min
3. Add ZnS shell dropwise
4. Heat to 240° C. and maintain for 60-70 min
5. Cool to RT and wash with ethanol/chloroform solvent (1:1 v/v)
6. Disperse in chloroform 5. Capped Q-Dot Synthesis Protocol (Low Temperature Aqueous Synthesis)
Sun, Q.; Fu, S.; Dong, T.; Liu, S.; Huang, C., Aqueous Synthesis and Characterization of TGA-capped CdSe Quantum Dots at Freezing Temperature. Molecules 2012, 17, 8430-8438.

1. Add 0.05 mmol Se powder and 0.15 mmol NaBH4 and 3.0 mL deionized water to a 25 mL round-bottom flask, and keep at 0° C. (ice bath) for 30 min to give a mixture A.
2. Mix 8.75 mL 0.2 mol/L CdCl2 and 1.1 mmol TGA in a round-bottom flask (II), and adjust the pH to 10.50 with 1 mol/L NaOH, followed by addition of mixture A via syringe at 0° C. under a nitrogen atmosphere. (solution color becomes bright yellow)

To obtain TGA-capped CdSe QDs, acetone precipitation with centrifugation at 12,000 rpm for 15 min. Treat with acetone for three repeated cycles to remove the contaminants.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A core-shell particle comprising a light-selective composition 100% free of surfactant residue, wherein the core of the particle is formed from a first metal precursor and a first anion precursor selected from the following:
   a first metal precursor selected from the group consisting of cadmium acetate, zinc acetate, and manganese acetate; and
   a first anion precursor selected from the group consisting of sodium sulfide and sodium selenide, and
wherein the shell of the particle is formed from a second metal precursor, a second anion precursor, and a dopant material selected from the following:
   a second metal precursor material selected from the group consisting of zinc acetate; and a second anion precursor selected from the group consisting of sodium sulfide: and a dopant material.

2. The particle of claim 1 wherein the particle has a diameter from about 5 to about 10 nanometers.

3. The particle of claim 2 wherein the light-selective composition comprises a light-emitting composition.

4. The particle of claim 3 wherein the light emitting composition comprises a fluorescent light-emitting composition.

5. The particle of claim 4 wherein the fluorescent light-emitting composition comprises a quantum dot.

6. The particle of claim 1 wherein at least a core layer within the core-shell particle comprises the light-selective material.

7. The particle of claim 1 wherein at least a shell layer within the core-shell particle comprises the light selective material.

8. The particle of claim 1 wherein each of a core layer and a shell layer within the core-shell particle comprise a light selective material.

9. The particle of claim 1 wherein one of the core layer and the shell layer within the core-shell particle comprises an insulator material formed from a precursor material selected from the group consisting of sodium gluconate, sodium salicylate, N-acetylcysteine and glutathione.

10. The particle of claim 1 wherein the shell layer within the core-shell particle comprises an insulator material.

\* \* \* \* \*